Oct. 27, 1925.
F. E. MODLIN, JR
1,559,344
FUEL CRACKING DEVICE FOR INTERNAL COMBUSTION ENGINES
Filed March 13, 1925    2 Sheets-Sheet 1
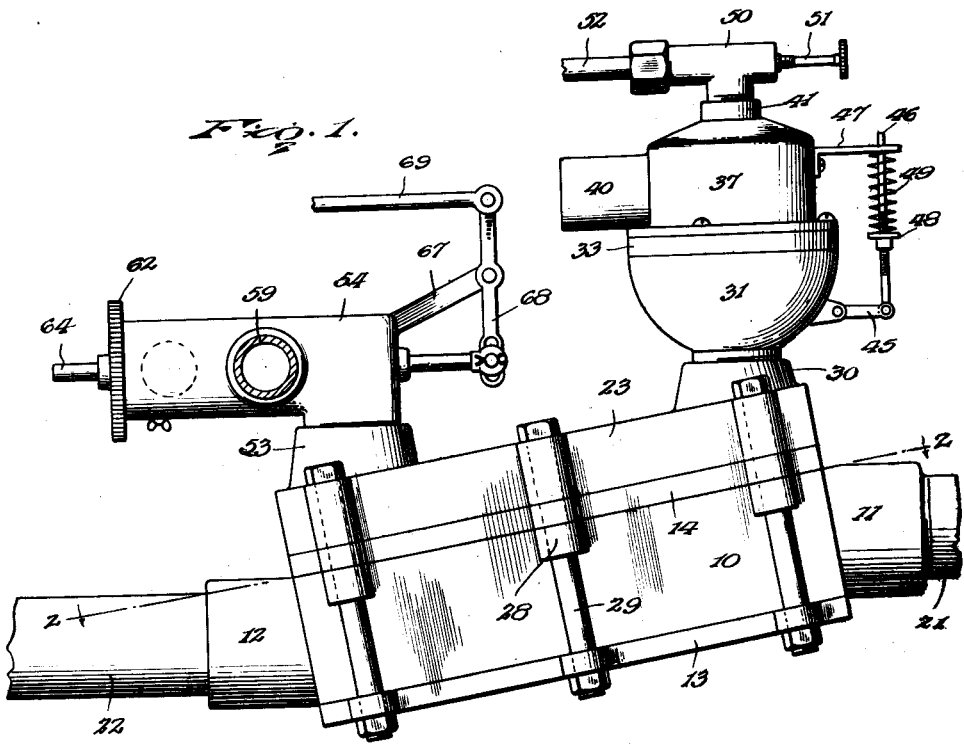
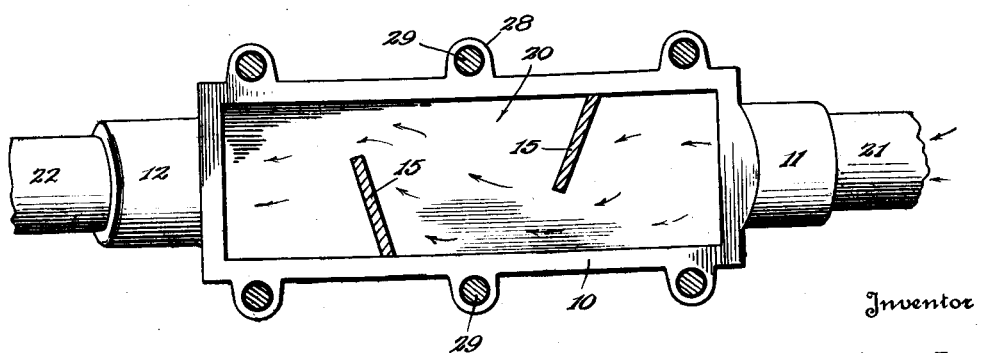
Inventor
F. E. Modlin, Jr.
By Lacy Lacey, Attorney.

Oct. 27, 1925.  
F. E. MODLIN, JR  
1,559,344  
FUEL CRACKING DEVICE FOR INTERNAL COMBUSTION ENGINES  
Filed March 13, 1925  2 Sheets-Sheet 2
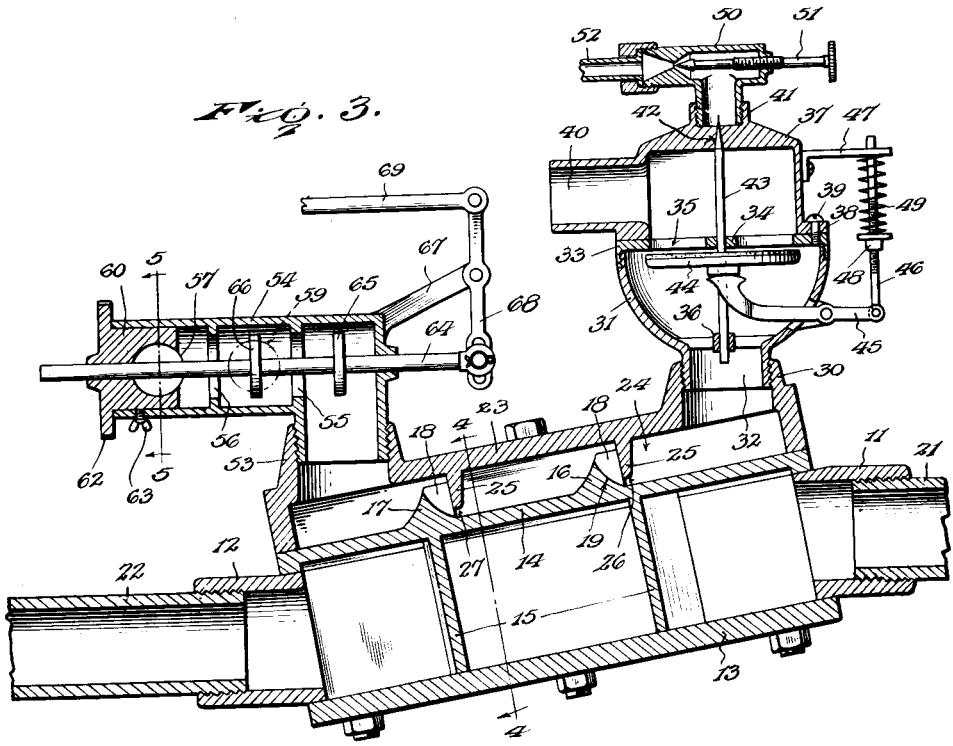
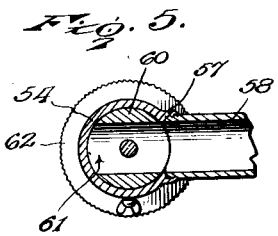
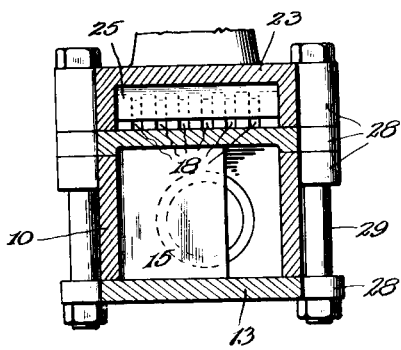
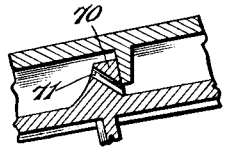
Inventor  
F. E. Modlin, Jr.  
By *Lacy Lacy*, Attorneys Patented Oct. 27, 1925.

1,559,344

UNITED STATES PATENT OFFICE.

FRANK E. MODLIN, JR., OF BURBANK, CALIFORNIA.

FUEL-CRACKING DEVICE FOR INTERNAL-COMBUSTION ENGINES.

Application filed March 13, 1925. Serial No. 15,402.

*To all whom it may concern:*

Be it known that I, FRANK E. MODLIN, Jr., a citizen of the United States, residing at Burbank, in the county of Los Angeles and State of California, have invented certain new and useful Improvements in Fuel-Cracking Devices for Internal-Combustion Engines, of which the following is a specification.

This invention relates to an improved fuel cracking device for generating fuel gas for internal combustion engines and seeks, among other objects, to provide a device which will efficiently handle low grade oils such as distillate tops, kerosene, or the like.

The invention seeks, as a further object, to provide a device which will gasify the entire content of the fuel passing therethrough so that no residue will be deposited either in the device or in the engine cylinders and which, by such complete gasification of the fuel, will make it possible to realize to the full the potential energy of the fuel so that an engine of a given rating will develop more power than with the use of ordinary high grade fuels.

A further important object, in this connection, is to provide a device wherein the liquid fuel will, while subjected to a high temperature, be caused to flow at high velocity through heated fuel baffles for atomizing the fuel into such minute particles that all of said particles will be thermally vaporized and the heavier content of the fuel along with the more volatile constituents thereof thus all transformed into a fuel gas.

Another object of the invention is to gasify the fuel in the presence of a restricted quantity of air to initially form a crude non-explosive mixture whereby to obviate premature combustion, and subsequently dilute the mixture with fresh air to not only render the mixture explosive for delivery to the engine but also for cooling the mixture whereby to prevent premature expansion thereof and effect a cool-running engine under all load conditions.

Still another object of the invention is to provide an automatic feed for the liquid fuel responsive to engine suction.

And the invention seeks, as a still further object, to provide an improved throttle for simultaneously regulating, in ratio, the flow of crude fuel gas and auxiliary fresh air introduced to form the final explosive mixture admitted to the engine.

Other and less important objects will appear as the description proceeds.

In the accompanying drawings:

Figure 1 is a side elevation of my improved fuel cracking device.

Figure 2 is a sectional view on the line 2—2 of Figure 1, looking in the direction indicated by the arrows, this view particularly showing the baffles in the heating chamber of the device.

Figure 3 is a vertical longitudinal sectional view more particularly illustrating the structural details of the device.

Figure 4 is a vertical transverse sectional view on the line 4—4 of Figure 3, looking in the direction indicated by the arrows, this view particularly showing the slots of the liquid fuel baffles employed.

Figure 5 is a detail sectional view on the line 5—5 of Figure 3, showing the combined auxiliary air valve and closure plug of the throttle valve casing.

Figure 6 is a detail vertical sectional view showing a slightly modified form of liquid fuel baffle.

In carrying the invention into effect, I employ an oblong casing 10 provided at one end with an inlet 11 and at its opposite end with an outlet 12. Closing the casing at its lower side is a bottom plate 13 and overlying the casing at its upper side is a heat transfer plate 14 having staggered inclined baffles 15 depending into the casing. Formed on the plate 14 at its upper side, adjacent the planes of the baffles 15, are spaced upstanding fuel baffles 16 and 17 extending transversely of said plate and respectively provided at their forward sides, as best shown in Figures 3 and 4, with a series of spaced parallel slots 18. These slots open through the rear vertical walls of said baffles as well as through the upper edges thereof and are provided with curved bottom walls 19 curving from the upper face of the plate 14 upwardly to the forward concave walls of said baffles.

It is now to be observed that the casing 10 is closed by the plates 13 and 14 to provide a heating chamber 20 and, as shown in Figure 2, the baffles 15 rest against the side walls of the casing while, as brought out in Figure 3, said baffles also abut the bottom plate 13 to form a tortuous passage through said chamber. Connecting the inlet 11 with the exhaust manifold of the engine with which the device is used, is a pipe 21 and connected with the outlet 12 is a discharge pipe 22. The plate 14 will thus be heated to a high temperature by the exhaust gases flowing through the chamber 20.

Overlying the plate 14 is a cover 23 mating with said plate to define an intervening gasifying chamber 24 and formed on the top wall of the cover are depending transverse flanges 25 abutting the rear vertical walls of the baffles 16 and 17. These flanges thus overlie the inlet ends of the slots 18 of the baffles throughout the major portion of the depth of said slots and extend close to the plate 14 to define reduced passages 26 and 27 at the entrances of said slots. Formed on the side edges of the plates 13 and 14 as well as upon the sides of the casing 10 and cover 23 are alined ears 28 and extending through said ears are bolts 29 clamping the parts together. As will be perceived, the chamber 24 will be heated by the heat transfer plate 14 and this plate with its baffles 15 and baffles 16 and 17, is formed of a soft composition of aluminum and copper. The plate is thus thermally sensitive and will readily absorb the heat in the heating chamber 20 and conduct the heat to the baffles 16 and 17 and to the chamber 24 while the heat will also be communicated from the baffles 16 and 17 to the flanges 25 of the cover. Accordingly, these flanges, as well as the baffles, will be heated to a high temperature and, in this connection, attention is directed to the fact that the walls of the slots 18 in the baffles will also be highly heated.

Adjacent its rear end, the cover 23 is provided with an inlet 30 and communicating with said inlet is a liquid fuel feeding device. This device includes a substantially hemispherical casing 31 having a nipple 32 screwed into the inlet 30, and screwed upon the upper end of the casing is a spider plate 33 having a spider 34 extending across a circular passage 35 in the plate. Alining with said spider is a spider 36 adjacent the lower end of the casing 31. Resting upon the plate 33 is a cylindrical cover 37 provided at its open end with a radial flange 38 secured to the plate 33 by cap screws 39. At one side, the cover 37 is provided with a primary air inlet 40 while at its upper end said cover is formed with a fuel inlet 41. Formed through the top wall of the cover axially of said inlet is a tapered orifice 42, and slidable through the spiders 34 and 36 is a fuel valve 43, the tapered upper end of which normally seats in said orifice closing the orifice. Fixed to the fuel valve below the spider 34 is a circular air valve 44 controlling the flow of air through the passage 35 of the plate 33. This valve is slightly greater in diameter than said passage and attention is directed to the fact that when the valve 43 is closed, the valve 44 stands slightly open to permit a restricted flow of air from the inlet 40 through the passage 35. Projecting through the wall of the casing 31 is a pivoted lever 45 bearing at its inner end against the hub of the valve 44, and connected to the outer end of said lever is an upstanding rod 46. Fixed to the cover 37 is a guide bracket 47 slidably receiving the upper end of said rod, and screwed on the rod is a nut 48 forming an abutment for the lower end of a spring 49 confined between the nut and said bracket. Thus, as will be seen, the spring 49 will normally hold the valve 43 closed while the nut 48 may be adjusted for regulating the tension of the spring on the valve. Screwed into the inlet 41 of the cover 37 is a valve casing 50 mounting a manually adjustable needle valve 51, and connected to the valve casing is a liquid fuel supply pipe 52, flow through which may be regulated by the adjustment of the valve 51.

Near its forward end, the cover 23 is provided with an outlet 53 and screwed at one end into said outlet is an L-shaped throttle valve casing 54, the horizontal portion of which is provided with spaced internal flanges defining passages 55 and 56. Formed in one side of the casing near its outer end is an auxiliary air inlet 57 into which may be screwed a pipe 58, and leading from the opposite side of the casing at a point between the passages 55 and 56 is an outlet pipe 59 connected to the intake manifold of the engine. Rotatably fitting in the outer end of the casing is a valve plug 60 which is provided, as shown in detail in Figure 5, with a passage 61 opening through the inner end of the plug and registering with the inlet 57, and formed on said plug is an annular flange 62 by means of which the plug may be manually turned. Thus, as will be seen, the plug may be rotatably adjusted to dispose the passage 61 of the plug out of register with the inlet passage 57 for regulating the flow of auxiliary air through said passages into the valve casing, and screwed through the wall of the casing to impinge the plug is a set screw 63 for locking the plug in adjusted position. Slidable through the inner end of the casing and through the plug 60 is an axially disposed valve rod 64 provided with spaced valve discs 65 and 66 for closing the passages 55 and 56. Projecting from the casing is an arm 67 and pivoted upon said arm is a lever 68, the lower end of which is connected to the valve rod. Connected to the upper end of said lever is a rod 69 and either a hand lever or a governor may be associated with said rod for rocking the lever 68 and shifting the valve rod 64.

As will now be seen in view of the foregoing, when the valve discs 65 and 66 are opened, engine suction communicated through the outlet pipe 59 will induce a draft through the chamber 24 so that air will be drawn in through the inlet 40 of the feeding device past the valve 44. This valve will then be shifted downwardly for opening the fuel valve 43 so that liquid fuel will be admitted through the orifice 42 into the chamber 24. The liquid fuel is then carried forwardly in said chamber to the passage 26 at which point the flow of the fuel and air will, due to the smallness of the passage, be accelerated to a very high velocity. At this increased velocity, the fuel will then be carried through the slots 18 of the baffle 16 so that the fuel will be divided into a number of fine streams directed by the upwardly curved bottom walls of said slots against the top wall of the cover 23. Upon striking said wall, the streams of fuel will be atomized by the impact so that the fuel will thus be delivered into the cavity between the breakers 16 and 17 in atomized form.

Upon entering the chamber 24, the liquid fuel will strike the plate 14 to be heated thereby and, upon being drawn through the passage 26 will be flattened out by the adjacent flange 25 against the plate in a thin film. The whole of the fuel will thus be directly subjected to the heating influence of the plate when, upon passing through the slots of the baffle 16, the streams of fuel will be further heated by the walls of said slots so that when the fuel streams strike the top wall of the cover, substantially complete vaporization is effected. Tests have shown that ideal efficiency is largely contingent upon the size of the passage 26. The liquid fuel must be mechanically flattened into a thin film against the plate 14 so that the whole of the fuel will be heated while the fuel must be divided into streams or jets and the velocity of the fuel increased to an extreme point to effect the atomizing thereof. The passage 26, like the passage 27, is, therefore, small, so that after the fuel has been distributed over the plate 14 by the adjacent flange 25 and thus flattened against said plate, the velocity of the fuel will be raised to a high point to enter the slots 18, when the fuel is divided or broken into separate streams. Only a restricted quantity of primary air is admitted with the fuel, the flow of primary air being merely to supply the draft. Accordingly, in the chamber 24, a crude non-explosive mixture is initially formed.

Upon entering the cavity between the baffles 16 and 17, a slight expansion is, due to the relative size of said chamber, permitted to take place. Any remaining liquid particles are thus permitted to fall to the plate 14 whence such particles and the vapor or gas formed are drawn through the passage 27. The gas and liquid fuel are thus again flattened against the plate 14 by the adjacent flange 25 when the flow is increased to a high velocity as the gas enters the slots of the baffle 17 and is divided into streams. The vapor or gas is thus further heated by the walls of said slots and impinged against the top wall of the cover, when all the liquid particles will be broken up and gasified. Complete gasification of the whole of the liquid fuel is thus effected and a dry, crude non-explosive gas is formed.

The crude gas formed is then drawn through the passage 55 of the throttle valve to meet a column of auxiliary fresh air drawn in through the inlet 57 and passage 56. The crude fuel gas is thus diluted to form an explosive mixture for delivery to the engine and the mixture is also cooled by the auxiliary air supply, with the result that premature expansion is avoided while cooling of the engine is also effected. The column of crude fuel gas rising into the valve casing 54 will, of course, tend to shift the valve disc 65 in one direction, while the column of fresh auxiliary air will tend to shift the valve disc 66 in the opposite direction. A balanced condition of the valve is accordingly hand and, as will be seen, when the valve rod 64 is shifted by the rod 69, the valve discs 65 and 66 will simultaneously regulate the flow of crude gas and auxiliary air in ratio so that a properly balanced explosive mixture will be obtained for all engine speeds and load conditions. As will be perceived, the pressure of the fuel gas flowing in one direction against the valve disc 65 will substantially equal the pressure of the auxiliary fresh air flowing in the opposite direction against the valve disc 66, so that these pressures will neutralize each other with the result that the currents flowing past the valve discs will exert very little if any pressure on the valve rod tending to shift the rod in either one direction or the other. For such reason, the valve is described as being balanced and, due to the balanced condition of the valve, the valve rod may be readily shifted by a governor or other automatic means connected with the rod 69 for adjusting the valve. As shown, the casing 10 is tilted from its rear end downwardly toward its forward end so that liquid fuel on the plate 14 will tend to gravitate toward the forward end of said plate.

In Figure 6 of the drawings, I have illustrated a slight modification of the invention wherein the baffles 70 of the heat transfer plate are each provided with a series of upwardly and forwardly inclined openings 71 in lieu of the slots 18. In some instances the openings may be found desirable.

Having thus described the invention, what I claim is:

1. A fuel cracking device including a heated gasifying chamber, means for feeding liquid fuel and a restricted quantity of air to said chamber to form a combustible gas, a throttle valve casing having an outlet, said casing being connected at one side of said outlet with said chamber and being formed at the opposite side of said outlet with an auxiliary air inlet, and a balanced valve reciprocable in the casing and including a valve rod provided with companion valve discs one controlling discharge of the gas from said chamber and the other controlling the intake of auxiliary air diluting the gas to form an explosive fuel mixture.

2. A fuel cracking device including a heated gasifying chamber, adapted for connection with an engine intake and having a heated wall, means for feeding liquid fuel and air to said chamber, means in said chamber for forming the fuel into a film in contact with said wall whereby the fuel is subjected uniformly to the heat and converted into a vapor mingling with the air to form a fuel gas, said second mentioned means defining a substantially restricted passage for raising the rate of flow of the vapor to a high velocity, and means for subsequently diluting the vapor with air to form a fuel mixture.

3. A fuel cracking device including a heated gasifying chamber adapted for connection with an engine intake and having a heated wall, means for feeding liquid fuel and air to said chamber, means in said chamber defining a substantially restricted passage for forming the fuel into a film in contact with said wall whereby the fuel is subjected uniformly to the heat and converted into a vapor mingling with the air to form a combustible gas, said second mentioned means including an element having separate reduced passages for dividing the vapor into separate small streams, and means for subsequently diluting the vapor with air to form a fuel mixture.

4. A fuel cracking device including a heated gasifying chamber adapted for connection with an engine intake and having a heated wall, means for feeding liquid fuel and air to said chamber, means in said chamber for forming the fuel into a film in contact with said wall whereby the fuel is subjected uniformly to the heat and converted into a vapor mingling with the air to form a fuel gas, said second mentioned means including an element for dividing the vapor into separate small streams and deflecting said stream to impinge on another wall of said chamber for breaking up any liquid particles by impact of the streams against such wall, and means for subsequently diluting the vapor with air to form a fuel mixture.

5. A fuel cracking device including a heated gasifying chamber adapted for connection with an engine intake and having a heated wall, means for feeding liquid fuel and air to said chamber, a baffle on said wall having separate reduced passages, a flange cooperating with said baffle for forming the fuel into a film in contact with said wall whereby the fuel is subjected uniformly to the heat and converted into a vapor flowing through the passages of the baffle and divided by the baffle into separate small streams heated by the baffle, and means for subsequently diluting the vapor with air to form a fuel mixture.

6. A fuel cracking device including a heated gasifying chamber adapted for connection with an engine intake and having a heated wall, means for feeding liquid fuel and air to said chamber, means in said chamber for forming the fuel into a film in contact with said wall whereby the fuel is subjected uniformly to the heat and converted into a vapor mingling with the air to form a fuel gas, said second mentioned means defining a substantially reduced passage for raising the rate of flow of the vapor to a high velocity and including an element for dividing the vapor into separate small streams when flowing at such high velocity, and means for subsequently diluting the vapor with air to form a fuel mixture.

7. A fuel cracking device including a heated gasifying chamber adapted for connection with an engine intake and having a heated wall, means for feeding liquid fuel and air to said chamber, means in said chamber for forming the fuel into a film in contact with said wall whereby the fuel is subjected uniformly to the heat and converted into a vapor mingling with the air to form a fuel gas, said second mentioned means defining a substantially reduced passage for raising the rate of flow of the vapor to a high velocity and including an element for dividing the vapor into separate small streams and deflecting said streams to impinge on another wall of said chamber for breaking up any liquid particles by the impact of said streams against such wall, and means for subsequently diluting the vapor with air to form a fuel mixture.

8. A fuel cracking device including a heated gasifying chamber adapted for connection with an engine intake and having a heated wall, means for feeding liquid fuel and air to said chamber, means in said chamber for forming the fuel into a film in contact with said wall whereby the fuel is subjected uniformly to the heat and converted into a vapor mingling with the air to form a fuel gas, said second mentioned means including an element having separate small passages for dividing the vapor into separate small streams and a coacting element defining a substantially restricted passage for raising the rate of flow of the vapor to a high velocity at the entrances of said first mentioned passages, and means for subsequently diluting the vapor with air to form a fuel mixture.

9. A fuel cracking device including a casing adapted for connection with an engine exhaust, a heat transfer plate closing the casing and provided with a baffle, a cover coacting with said plate to define a gasifying chamber for connection with an engine intake, means for feeding liquid fuel and air to said chamber, and a flange on the cover cooperating with the baffle for forming the fuel into a film in contact with said plate whereby the fuel is subjected uniformly to the heat and converted into a vapor mingling with the air to form a fuel gas, said flange defining a substantially reduced passage for accelerating the rate of flow of the vapor through the baffle to a high velocity, and means for subsequently diluting the vapor with air to form a fuel mixture.

10. A fuel cracking device including a heated gasifying chamber, means for feeding liquid fuel and a restricted quantity of air to said chamber to form a combustible gas, a throttle valve casing connected to said chamber and provided with an auxiliary air inlet, a balanced valve reciprocable in the casing and including a valve rod provided with companion valve discs one controlling the discharge of gas from said chamber and the other controlling the intake of auxiliary air at said inlet for diluting the gas to form a fuel mixture, and a valve adjustable for regulating the effective area of said inlet.

In testimony whereof I affix my signature.

FRANK E. MODLIN, JR. [L. S.]